United States Patent
Jaaskelainen et al.

(10) Patent No.: US 10,408,694 B2
(45) Date of Patent: Sep. 10, 2019

(54) METHOD TO COMPENSATE MEASUREMENT ERROR OF FIBER BRAGG GRATING SENSOR CAUSED BY HYDROGEN DARKENING

(71) Applicant: Halliburton Energy Services, Inc., Houston, TX (US)

(72) Inventors: Mikko Jaaskelainen, Katy, TX (US); Yunmiao Wang, Houston, TX (US); Seldon Benjamin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/075,848

(22) PCT Filed: Jun. 7, 2016

(86) PCT No.: PCT/US2016/036174
§ 371 (c)(1),
(2) Date: Aug. 6, 2018

(87) PCT Pub. No.: WO2017/213630
PCT Pub. Date: Dec. 14, 2017

(65) Prior Publication Data
US 2019/0033146 A1   Jan. 31, 2019

(51) Int. Cl.
*G01L 1/24*   (2006.01)
*G01L 25/00*   (2006.01)
*H04B 10/07*   (2013.01)

(52) U.S. Cl.
CPC .............. *G01L 1/246* (2013.01); *G01L 25/00* (2013.01); *H04B 10/07* (2013.01)

(58) Field of Classification Search
CPC .......... G01L 1/246; G01L 25/00; H04B 10/07
See application file for complete search history.

(56) References Cited

U.S. PATENT DOCUMENTS 5,892,860 A * 4/1999 Maron ............... G01D 5/35383
374/E5.034
6,563,970 B1 * 5/2003 Bohnert ................ G01L 9/0007
385/13

(Continued)

FOREIGN PATENT DOCUMENTS

WO   2015020674 A1   2/2015
WO   2016029110 A1   2/2016

OTHER PUBLICATIONS

PCT Application Serial No. PCT/US2016/036174, International Search Report, dated Jan. 16, 2017, 3 pages.
(Continued)

*Primary Examiner* — Thomas A Hollweg
*Assistant Examiner* — Mary A El-Shammaa
(74) *Attorney, Agent, or Firm* — Gilliam IP PLLC (57) ABSTRACT

A method is described for compensating measurement errors of fiber Bragg grating (FBG) sensors installed in fiber cables in down-hole oil and gas environments due to hydrogen darkening. The method involves loading a fiber of known length and multiple FBG sensors in a hydrogen chamber with control of temperature, hydrogen concentration, pressure, and time and adjusting each of the variables through a test matrix while continuously measuring and recording the fiber transmission loss and FBG spectrum changes, then creating a correlation map of fiber transmission loss vs. Bragg wavelength shift, and using that map for compensating the wavelength shift of downhole installed fiber cables as a function of their hydrogen induced transmission loss through time.

20 Claims, 5 Drawing Sheets

(56) References Cited

U.S. PATENT DOCUMENTS

| | | | |
|---|---|---|---|
| 7,792,392 B2 | 9/2010 | Chen et al. | |
| 9,797,783 B2* | 10/2017 | Johnston | G02B 6/02052 |
| 9,897,497 B2* | 2/2018 | LeBlanc | G01L 9/04 |
| 2005/0129365 A1* | 6/2005 | Johnson | G02B 6/0218 |
| | | | 385/37 |
| 2008/0285908 A1* | 11/2008 | Ling | G01D 5/268 |
| | | | 385/13 |
| 2009/0297089 A1* | 12/2009 | Huang | G01D 5/35303 |
| | | | 385/12 |
| 2013/0317372 A1* | 11/2013 | Eberle | A61B 5/02154 |
| | | | 600/478 |
| 2014/0158877 A1 | 6/2014 | Wysocki et al. | |
| 2014/0294041 A1 | 10/2014 | Zhang et al. | |
| 2017/0146417 A1* | 5/2017 | LeBlanc | G01L 9/04 |

OTHER PUBLICATIONS

PCT Application Serial No. PCT/US2016/036174, International Written Opinion, dated Jan. 16, 2017, 4 pages.

CA Application Serial No. 3,014,545, Office Action 1, dated Apr. 15, 2019, 5 pages.

\* cited by examiner

METHOD TO COMPENSATE MEASUREMENT ERROR OF FIBER BRAGG GRATING SENSOR CAUSED BY HYDROGEN DARKENING

BACKGROUND

The present disclosure relates to compensate hydrogen induced measurement error of fiber Bragg grating sensors. More particularly, it relates to correlate the hydrogen induced Bragg wavelength shift with hydrogen induced fiber transmission loss and further actively compensate Bragg wavelength shift.

Fiber optic sensors are attractive for harsh environment applications due to advantages including good high-temperature capability, corrosion resistance and electromagnetic insensitivity. The oil and gas industry has increasingly adopted fiber optic sensors to monitor producing zones and take actions to optimize production. Fiber Bragg gratings (FBG) are found to be one of the fiber optic sensors suitable for oil/gas application because of ease of multiplexing and simple wavelength decoding.

Figure 1:
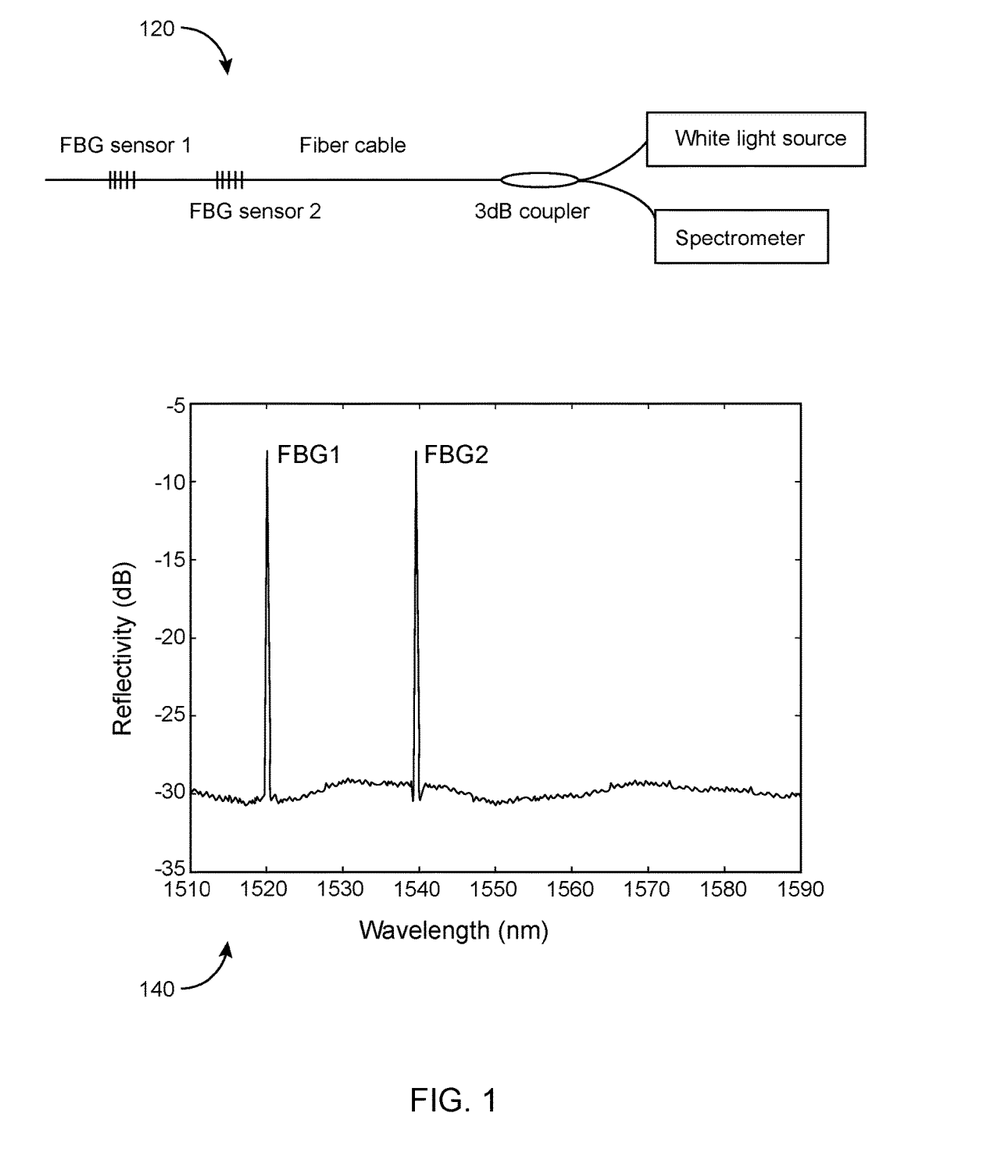
FIG. 1 illustrates first a Fiber Bragg Grating sensor system and secondly the reflective spectra of two multiplexed FBG sensors.

FBG is a structure formed by periodically changing the refractive index of a fiber core. When a broadband light is launched into a fiber, only the light at a specific wavelength will be reflected, which is defined as Bragg wavelength and can be modulated by measurands of interest such as temperature, strain, chemicals etc. More than one FBG sensor can be serially multiplexed in a fiber as illustrated 120 in FIG. 1 and share the same interrogation system. The FBG sensors should have different Bragg wavelengths to allow them to be distinguished in the wavelength domain. The interrogation system includes a white light source or a wavelength tunable laser, several couplers and a spectrometer. Each FBG sensor can be used to measure a particular parameter of interest. For example, FBG sensor 1 could be used to measure temperature, and FBG sensor 2 could be used to measure strain. A reflective spectrum of two multiplexed FBG sensors is shown as 140.

One commonly adopted method to manufacture FBG is by illuminating a fiber with periodic interference pattern generated by ultra-violet (UV) light. The fiber used to make FBG's typically include photosensitive dopant, such as germanium and the refractive index modulation is believed to be formed by UV-induced breaking of electronic bonds in the Ge-based defects, releasing electrons which are thereafter re-trapped at other sites in the glass matrix.

Figure 2:
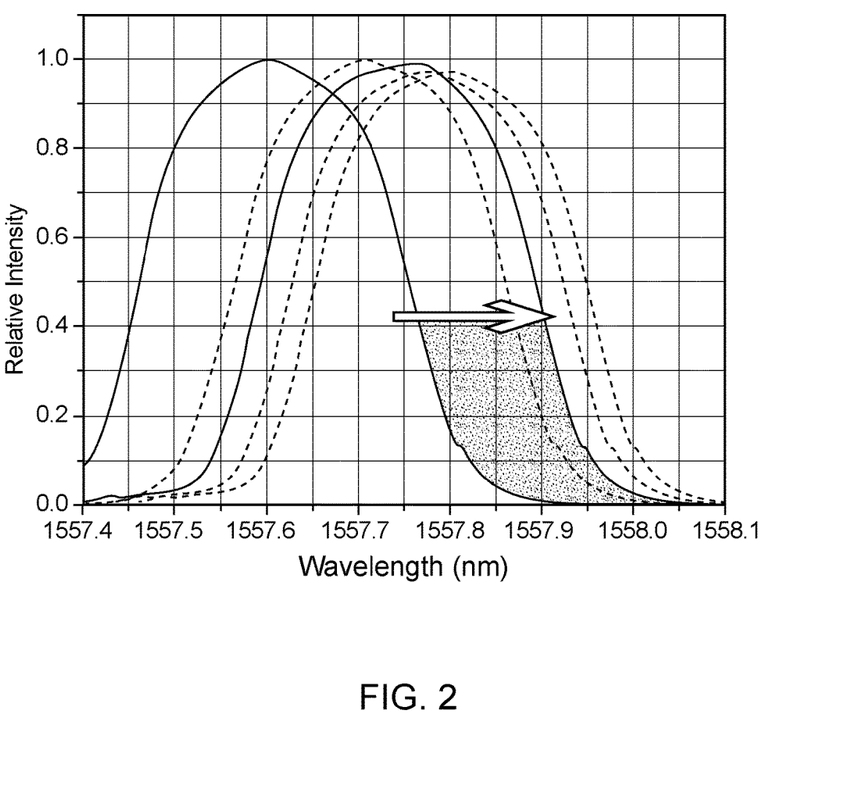
FIG. 2 illustrates the Fiber Bragg Grating wavelength shift from hydrogen diffusion.

It is known that the hydrogen diffusion into optical fibers is pervasive in the oil and gas well environment. The diffusion of hydrogen into the core of the Germanium-doped fiber will cause a change in the refractive index and consequently modify the Bragg wavelength of an FBG written into the core of the fiber. FIG. 2 shows the hydrogen induced Bragg wavelength shift over time. The hydrogen-induced change is found to be temperature dependent in short term: at low temperature (<150 C), the Bragg wavelength shift is mainly dominated by hydrogen diffusion and at elevated temperature (>150 C), the Bragg wavelength shift is caused by permanent reaction with hydrogen and diffusion of Hydrogen. In long term, the shift will level out over time to a value that is proportional to the hydrogen concentration and the defects in the fiber. In the wellbore, temperatures can be up to 300° C. and it means the FBG based sensor would have inevitable wavelength drift error over time. Thus, a need remained in the art for a technique to actively compensate the Bragg wavelength shift of FBG sensor used in hydrogen-rich, high temperature, harsh environment such as oil and gas wells. This disclosure provides this ability.

BRIEF DESCRIPTION OF THE DRAWINGS

FIG. 6 illustrates (6A) the reflective spectrum of an FP fiber sensor without hydrogen darkening, (6B) the spectrum of the same fiber sensor with darkening, and (6C) the fiber transmission loss measured from the spectra acquired before and after darkening.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Figure 3:
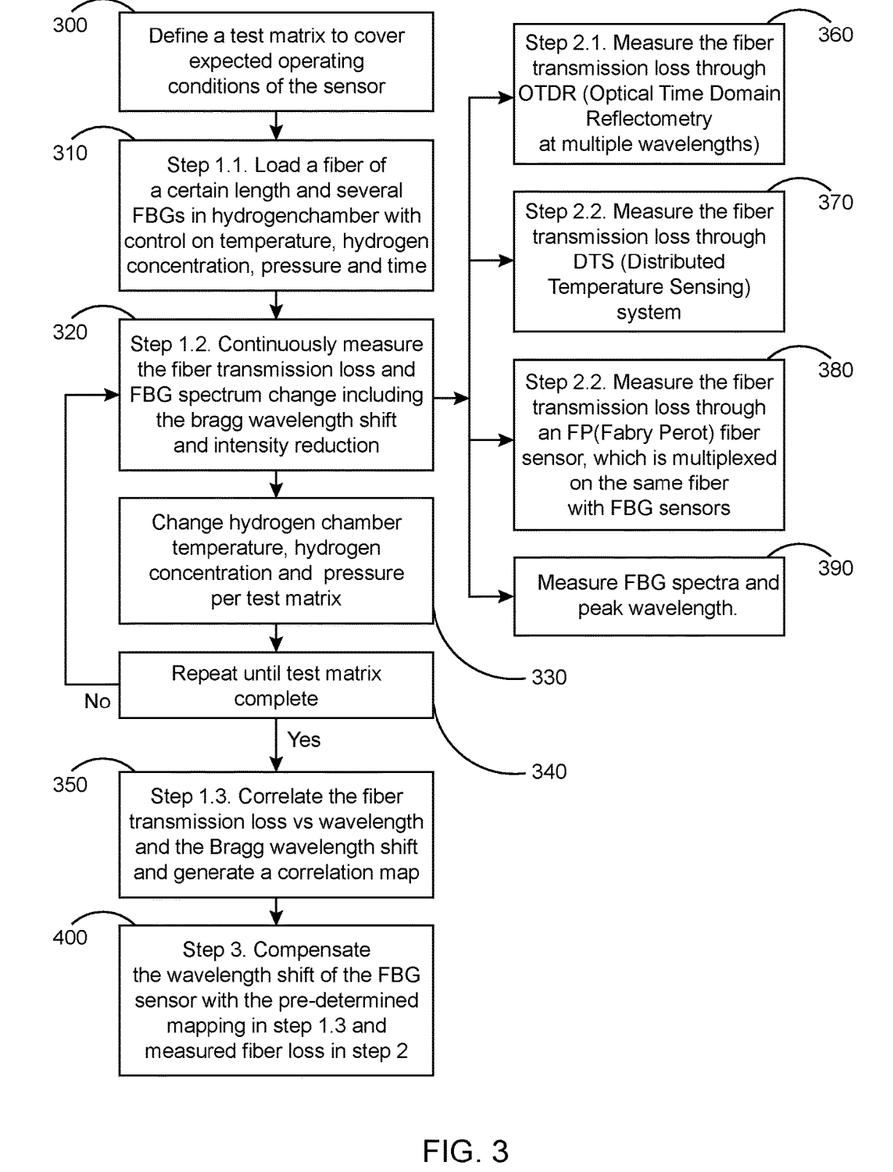
FIG. 3 is a flowchart of the proposed three-step procedure to address the hydrogen darkening issue.

This proposal includes three steps as detailed in FIG. 3. Step 1—Correlate the fiber transmission loss caused by hydrogen with the Bragg wavelength shift caused by hydrogen by experiment. Step 2—Measure the hydrogen induced transmission loss of the installed fiber cables through optical time domain reflectometry (OTDR), distributed temperature sensing (DTS) system, or an FP fiber sensor multiplexed on the same fiber. Step 3—Compensate the wavelength shift of the FBG sensor written on the same cable.

Figure 4:
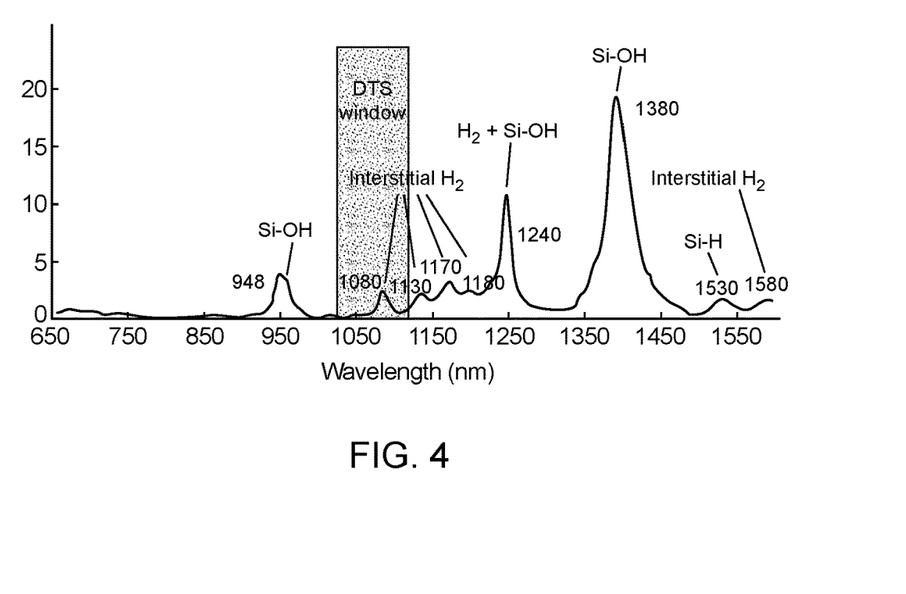
FIG. 4 illustrates fiber spectral attenuation due to hydrogen-induced loss.

Step 1: It is known that the hydrogen diffusion into optical fibers results in the attenuation of the light being transmitted, due both to the presence of molecule H2 and the reaction of hydrogen with defects in the fibers. The fiber attenuation processes are quite complicated and vary considerably for the different types of fibers at different environment. For example, hermetical carbon coating fiber is found to helpful to prevent the hydrogen diffusion into the silica fiber under 150 C and thus can reduce hydrogen induced transmission loss compared with the fibers without hermetic carbon coating. However when temperature is above 150 C, the carbon coating fibers lose the hermeticity and no longer has such advantage over other coatings. It has been also found that when exposing hydrogen to germanium-doped fibers, a Ge—OH bond is produced to increase the transmission loss. Thus pure core fibers usually show less hydrogen-induced transmission loss than Ge-doped fibers. Because of the Si—O, Si—H, Si—OH bond formation when hydrogen is present, all the kinds of fibers show different levels transmission loss. In general, they show some common features when hydrogen darkening happens.
1. As exhibited in FIG. 4, the resulting absorption occurred over nearly the entire wavelength range of interested from 650 nm to 1600 nm. There are a number of absorption peaks occurring at such as 1240 nm, 1380 nm and so on. FIG. 4 illustrates the typical fiber spectral attenuation due to hydrogen-induced loss.
2. The absorption loss is temperature and pressure dependent. The absorption loss rate increases at high temperature and high pressure, some models have been developed to describe the absorption loss under different temperature and pressure conditions,
3. At a given temperature and pressure condition, the absorption loss is in proportion to the concentration of hydrogen after some period of time.

As discussed earlier, the hydrogen can also cause the Bragg wavelength shift. The associated mechanisms are very similar to that of hydrogen-induced transmission loss. Both Ge—OH and Si—OH formation occur with the refractive index rise. The Bragg wavelength shift is temperature and pressure dependent and proportional to the concentration of hydrogen. All the common features indicate we can correlate these two effects caused by hydrogen diffusion into fiber and reaction with defects in the fibers. The proposed approach illustrated in flow diagram of FIG. 3 is to firstly 300 define a test matrix of fiber type, temperature, hydrogen concentration, and pressure, to cover the expected operating conditions for the FBG sensors. Then 310, 320 load a fiber of a defined length and several FBG's into a hydrogen chamber with control of temperature, hydrogen concentration, pressure, and time and measure and record the fiber transmission loss and the Bragg wavelength shift and intensity reduction under controlled conditions. The controlled parameters include fiber type, time, temperature, pressure and concentration of hydrogen and the parameters are controlled to match the conditions inside an oil/gas well. As the method continues 330 the hydrogen chamber temperature, hydrogen concentration, and pressure are varied per the test matrix 300. These (steps 320, 330, 340) is continued until the test matrix is completed. While the test matrix is being done the data of Step 2 is being generated.

Step 2: Before the fiber cable is deployed in the well, there is no attenuation induced by hydrogen ($\alpha_H$=0 dB/km). The transmission loss of the fiber is determined by the fiber. After the fiber cable with FBG sensors is deployed in the well, the hydrogen-induced transmission loss will increase over time, which can be calculated by measuring the cable transmission loss and subtracting the reference loss obtained before the cable is deployed. The fiber transmission loss can be measured through OTDR 360, DTS interrogators 370, the spectrum of an FP sensor 380 that is multiplexed on the same fiber with FBG sensors, and the measurement and recording 390 of the FBG spectra, including the Bragg peak wavelength and Bragg intensity.

Figure 6A:
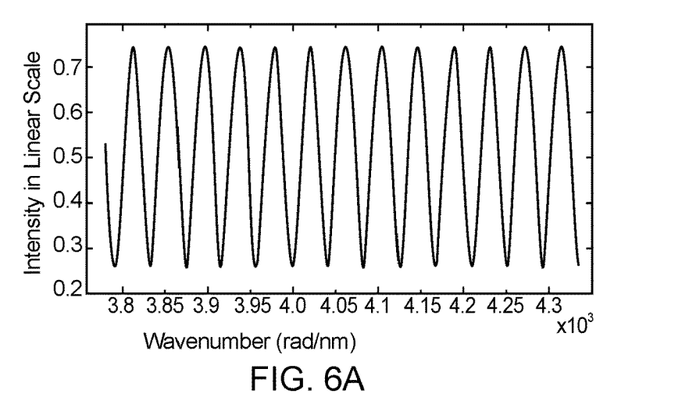
Figure 6B:
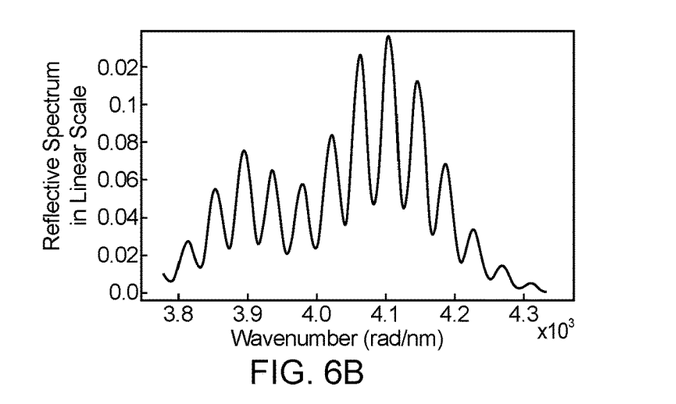
Figure 6C:
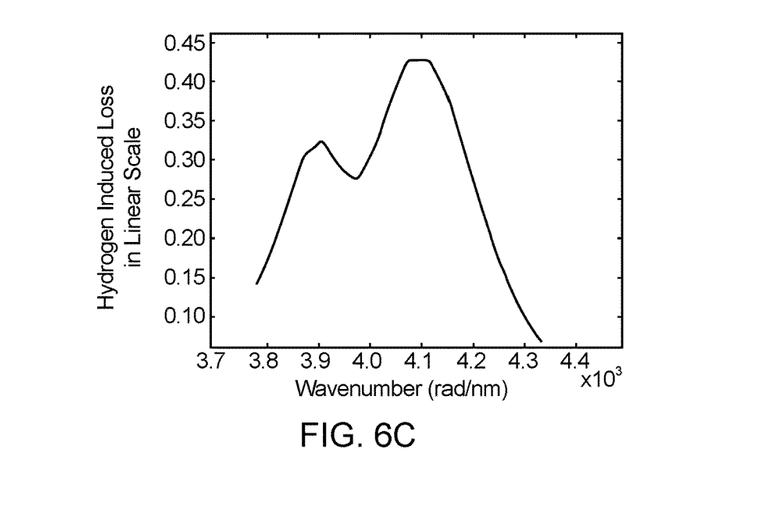

For OTDR and DTS interrogators, the hydrogen loss is determined by measuring the pulsed light intensity reflected due to Rayleigh or Ramn Stokes scattering at different locations along the fiber. When FBG sensors are multiplexed with a FP sensor on the same fiber, the hydrogen loss of the fiber can be calculated from the spectrum of the FP sensor obtained by white-lighter interferometry or wavelength-scanning spectrometer. The fiber transmission loss can be calculated from the two spectra before and after the hydrogen darkening. The calculation methodology is described in PCT/US14/72074. From that reference, FIGS. 6(a) and 6(b) show the spectra of an FP sensor before and after hydrogen darkening happen respectively; FIG. 6(c) shows the calculated hydrogen-induced transmission loss.

Figure 5:
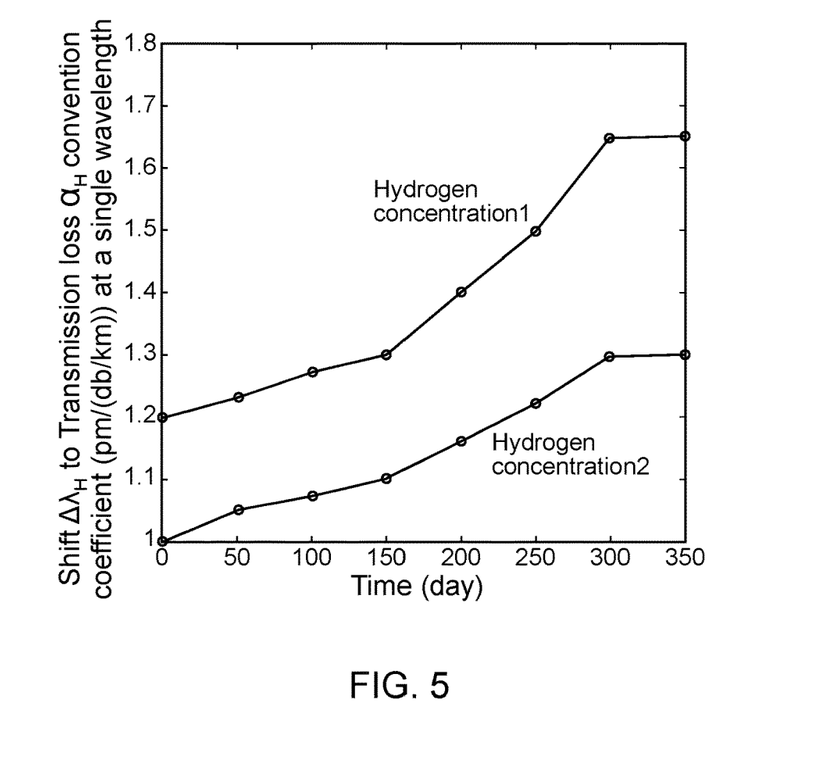
FIG. 5 illustrates a mapping between the hydrogen induced Bragg wavelength shift and hydrogen induced transmission loss.

With the measurement results, we can generate 350 a mapping between Bragg wavelength shift and transmission loss at a particular wavelength ($\alpha\lambda_H$ pm versus $\alpha_H$ dB/km) as illustrated in FIG. 5. The transmission loss used to map the Bragg wavelength shift can locate at the absorption peaks or any wavelength in the range of interest, for example, the wavelength used for distributed temperature system (DTS).

Step 3: The down-hole temperature can be measured through different kinds of sensors such as thermocouple, DTS or even FBG sensor itself. With the pre-determined mapping (step 350) between the Bragg wavelength shift and transmission loss and the measured transmission loss acquired in step 2, the corresponding Bragg wavelength shift can be estimated and applied 400 to compensate the measurement error. This proposed method is a real-time compensation method that can apply on all the FBGs multiplexed on the same fiber cable.

Value Added

This proposal provides a solution to actively real-time compensate the error of FBG sensors induced by hydrogen darkening. Hydrogen induced measurement error is highly undesired for fiber optic sensors used for oil and gas application. Currently there is no such solution available on the market to compensate the wavelength measurement error of FBG sensors induced by hydrogen darkening.

Although certain embodiments and their advantages have been described herein in detail, it should be understood that various changes, substitutions and alterations could be made without departing from the coverage as defined by the appended claims. Moreover, the potential applications of the disclosed techniques are not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:
1. A method for compensating measurement errors of fiber Bragg grating (FBG) sensors installed in a fiber cable in a borehole comprising:
  defining a test matrix of temperature, hydrogen concentration, and pressure to cover expected operating conditions of the FBG sensors;
  loading the fiber cable comprising a fiber of known length and a plurality of FBG sensors into a hydrogen chamber;
  measuring a fiber transmission loss and an FBG spectrum change including a Bragg wavelength shift and intensity reduction of the fiber cable while the fiber cable is loaded in the hydrogen chamber and while varying one or more of temperature, hydrogen concentration, and pressure within the hydrogen chamber per the test matrix and until the test matrix is completed to generate a measurement result;
  correlating the fiber transmission loss versus a wavelength and the Bragg wavelength shift to generate a correlation map based on the measurement result;

measuring a hydrogen induced transmission loss of the fiber cable when the fiber cable is installed in the borehole; and compensating the Bragg wavelength shift of the FBG sensors of the fiber cable installed in the borehole based on the correlation map and the hydrogen induced transmission loss.

2. The method of claim 1 wherein the measuring of the hydrogen induced transmission loss comprises measuring the hydrogen induced transmission loss through Optical Time Domain Reflectometry (OTDR) at multiple wavelengths.

3. The method of claim 1 wherein the measuring of the hydrogen induced transmission loss comprises measuring the hydrogen induced transmission loss through a Distributed Temperature Sensing (DTS) system.

4. The method of claim 1 wherein the measuring of the hydrogen induced transmission loss comprises measuring the hydrogen induced transmission loss through a Fabry Perot (FP) fiber sensor multiplexed on the fiber cable.

5. The method of claim 1 wherein the measuring of the hydrogen induced transmission loss comprises measuring an FBG spectra, including Bragg peak wavelength and Bragg intensity.

6. A method comprising:
loading a test fiber cable having a test grating sensor in a hydrogen chamber, the hydrogen chamber having control over a temperature, a hydrogen concentration, and a pressure within the hydrogen chamber;
performing operations while the test fiber cable is loaded in the hydrogen chamber, the operations comprising,
varying one or more of the temperature, the hydrogen concentration, and the pressure within the hydrogen chamber according to a test matrix until the test matrix is completed, and
while operating the hydrogen chamber according to the test matrix and until the test matrix is completed, transmitting a light along the test fiber cable, detecting the light by the test grating sensor, and measuring, based on the detected light, a fiber transmission loss and a grating spectrum change of the light transmitted along the test fiber cable to generate a measurement result;
correlating the fiber transmission loss with at least one of a wavelength and a wavelength shift of the light during the transmission to generate a correlation map based on the measurement result;
positioning an installed fiber cable down a borehole, the installed fiber cable having an installed grating sensor;
transmitting a light along the installed fiber cable;
detecting the light by the installed grating sensor of the installed fiber cable;
measuring, based on the detected light, a hydrogen induced transmission loss of installed fiber cable; and
compensating a wavelength shift of the installed grating sensor based on the correlation map and the hydrogen induced transmission loss.

7. The method of claim 6, wherein measuring the fiber transmission loss and the grating spectrum change comprises measuring a wavelength shift and an intensity reduction of a transmission of light along the test fiber cable.

8. The method of claim 6, wherein the test grating sensor and the installed grating sensor are fiber Bragg grating (FBG) sensors.

9. The method of claim 6, wherein measuring the hydrogen induced transmission loss comprises measuring the hydrogen induced transmission loss through Optical Time Domain Reflectometry (OTDR) at multiple wavelengths.

10. The method of claim 6, wherein measuring the hydrogen induced transmission loss comprises measuring the hydrogen induced transmission loss through a Distributed Temperature Sensing (DTS) system.

11. The method of claim 6, wherein measuring the hydrogen induced transmission loss comprises measuring the hydrogen induced transmission loss through a Fabry Perot (FP) fiber sensor multiplexed on the installed fiber cable.

12. The method of claim 6, wherein measuring the hydrogen induced transmission loss comprises measuring an FBG spectra, including Bragg peak wavelength and Bragg intensity.

13. A system comprising:
a hydrogen chamber configured to control a temperature, a hydrogen concentration, and a pressure within the hydrogen chamber according to a test matrix and configured to hold a test fiber cable having a test grating sensor;
a first machine configured to perform a set of operations while the test fiber cable is in the hydrogen chamber and the hydrogen chamber is controlling the temperature, the hydrogen concentration, and the pressure within the hydrogen chamber according to the test matrix until the test matrix is completed, the first machine configured to perform the set of operations that comprises
transmit a light along the test fiber cable,
detect the light by the test grating sensor, and
measure, based on the detected light, a fiber transmission loss and a grating spectrum change of the light transmitted along the test fiber cable to generate a measurement results, and
correlate the fiber transmission loss with at least one of a wavelength and a wavelength shift of the light during the transmission to generate a correlation map based on the measurement results;
and
a second machine configured to,
transmit a light along an installed fiber cable positioned down a borehole, the installed fiber cable having an installed grating sensor, wherein the installed grating sensor of the installed fiber cable is configured to,
detect the light,
measure, based on the detected light, a hydrogen induced transmission loss of installed fiber cable, and
compensate a wavelength shift of the installed grating sensor based on the correlation map and the hydrogen induced transmission loss.

14. The system of claim 13, wherein the first machine is further configured to measure a wavelength shift and an intensity reduction of a transmission of the light along the test fiber cable.

15. The system of claim 13, wherein the test grating sensor and the installed grating sensor are fiber Bragg grating (FBG) sensors.

16. The system of claim 13, wherein the second machine is further configured to measure the hydrogen induced transmission loss through Optical Time Domain Reflectometry (OTDR) at multiple wavelengths.

17. The system of claim 13, wherein the second machine is further configured to measure the hydrogen induced transmission loss through a Distributed Temperature Sensing (DTS) system.

18. The system of claim 13, wherein the second machine is further configured to measure the hydrogen induced transmission loss through a Fabry Perot (FP) fiber sensor multiplexed on the installed fiber cable.

19. The system of claim 13, wherein the second machine is further configured to measure the hydrogen induced transmission loss through a fiber Bragg grating (FBG) spectra.

20. The system of claim 19, wherein the second machine is further configured to measure the hydrogen induced transmission loss based on Bragg peak wavelength and Bragg intensity.

\* \* \* \* \*